United States Patent

[11] 3,612,669

[72] Inventor William L. Vinson
6145 Vine St., Philadelphia, Pa. 19139
[21] Appl. No. 841,714
[22] Filed July 15, 1969
[45] Patented Oct. 12, 1971

[54] SPECTACLE FRAME
1 Claim, 3 Drawing Figs.
[52] U.S. Cl. ........................................................ 351/123, 351/111
[51] Int. Cl. ...................................................... G02c 5/14
[50] Field of Search ............................................ 351/111, 123

[56] References Cited
UNITED STATES PATENTS
2,108,074  2/1938  McMahon .................... 351/111 UX
3,475,083  10/1969  Gitlin et al. .................. 351/111 X Primary Examiner—David Schonberg
Assistant Examiner—John W. Leonard
Attorney—Seidel, Gonda & Goldhammer ABSTRACT: A spectacle frame having temples or sidepieces which are supported by the ears of a wearer and engage the head of a wearer at the occipital bone and parietal bone beyond the mastoid process. The temple ends have a Y-junction which grip the rear portion of the head of a wearer thus relieving pressures attendant with the wearing of spectacles having conventional temples. The upwardly extending leg of the Y-junction is adapted to engage the parietal bone whereas the downwardly extending leg of the Y-junction is adapted to engage the occipital bone.

PATENTED OCT 12 1971 3,612,669
Fig. 1.
Fig. 2.
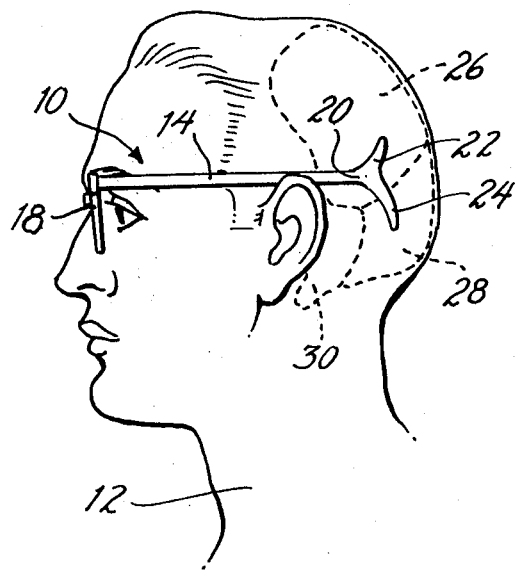
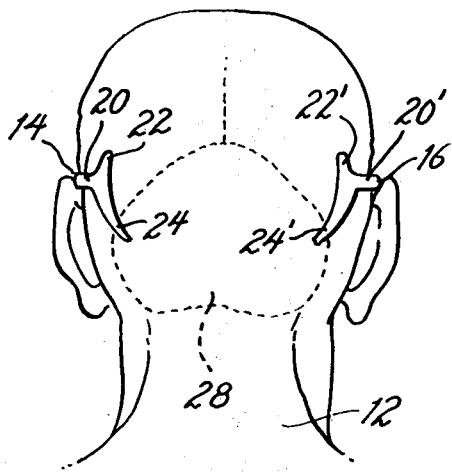
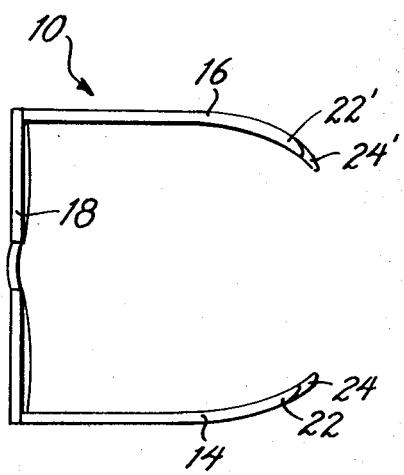
Fig. 3.
INVENTOR.
WILLIAM L. VINSON
BY
Seidel, Gonda & Goldhammer
ATTORNEYS.

SPECTACLE FRAME

The present invention relates to a spectacle frame, and particularly, to a spectacle frame which has temples or sidepieces which engage the head of a wearer beyond the mastoid process.

It is well known that pressures attendant to wearing spectacles and especially those pressures attendant to the usage of temples which terminate at the ear of a wearer can create irritation and discomfort for a wearer. The temples encircle the ears so that the spectacles will be prevented from shifting forwardly on the head of a wearer. However, such encirclement creates undesirable pressures, especially wherein the ends of the temple-engaging members press inwardly against the head adjacent the ears of the wearer. Such pressures can cause headaches and should be avoided.

It is an object of the present invention to provide a spectacle frame having temples which engage the head of a wearer beyond the ears of a wearer and beyond the mastoid process.

It is another object of the present invention to provide a spectacle frame having temples which terminate in a Y-junction wherein one leg of the junction is adapted to engage the occipital bone and the other leg of the junction is adapted to engage the parietal bone.

It is a further object of the present invention to provide a spectacle frame wherein temples are provided which are supported by the ears of a wearer, the temples terminating in a Y-junction, the portions of the Y-junction being biased inwardly in order to firmly engage the head of a wearer.

It is still a further object of the present invention to provide a spectacle frame which will eliminate the undesirable pressures attendant to wearing spectacles having conventional temples.

Other objects will appear hereinafter.

The above and other objects are accomplished by means of the present invention. The spectacle frame of this invention includes temples or sidepieces which are given support by the ears of a wearer but which engage the head of a wearer substantially beyond the ears. The temples terminate in a Y-junction wherein the upstanding leg of the Y engages the parietal bone and the downwardly depending leg engages the occipital bone. The Y-junction extends beyond the mastoid process and the ends of the legs are directed inwardly so that shifting or movement of the glasses on the head of a wearer is prevented.

The upstanding leg of the Y-junction is shorter than the downwardly depending leg thereof. The downwardly depending leg performs the greatest gripping function as it bends around and engages the occipital bone which provides substantial support for the spectacles and substantially prevents shifting thereof. The upwardly extending leg cooperates with the downwardly depending leg to prevent shifting of the spectacles on the head of a wearer. The remainder of the spectacle frame, with the exception of the temples, is conventional.

For the purpose of illustrating the invention, there is shown in the drawings a form which is presently preferred, it being understood, however, that this invention is not limited to the precise arrangements and instrumentalities shown.

FIG. 1 is a side elevation of an individual wearing spectacles having temples which form the basis of the present invention;

FIG. 2 is a rear elevation view of the wearer of FIG. 1 showing the Y-junction at the temple ends; and FIG. 3 is a top elevation view of the spectacle frame produced in accordance with the present invention.

Referring now to the drawings in detail, wherein like reference numerals indicate like structure throughout the several views, there is shown in FIGS. 1–3 spectacles generally indicated by the reference numeral 10. The spectacles 10 are shown on a wearer 12.

The spectacles 10 include temples 14 and 16. The temples 14 and 16 are substantially identical and therefore only one of the temples will be described in detail. The temples are identical in structure, although one temple is particularly adapted for the left side of the spectacles, whereas the other temple is particularly adapted to the right side of the spectacles. Therefore, identical structure on temple 16 will be indicated by a prime notation of the same reference numeral used in describing temple 14.

The temples are connected to a front frame 18. The front frame 18 and temples 14 and 16 comprise the spectacle frame. The front frame is conventional. Conventional connecting means may be utilized to secure temples 14 and 16 to the front frame 18.

Temple 14 terminates in a Y-junction 20. The Y-junction 20 includes an upstanding leg 22 and a downwardly depending leg 24. The upstanding leg 22 is substantially shorter than the downwardly depending leg 24. The downwardly depending leg 24 extends further rearwardly then the upstanding leg 22. The ends of the legs 22 and 24 are biased inwardly so as to provide a gripping means for gripping the head of a wearer so that the spectacles 10 will not shift or fall off the wearer 12.

The temple 14 is supported by the junction of the ear to the wearer's head which junction has generally a V-shape. The junction of the ear to the head provides a natural support for the temples 14 and 16.

The temples 14 and 16 extend beyond the mastoid process 30. The upstanding leg 22 of the temple 14 is adapted to engage the parietal bone 26, the general configuration of which is outlined by phantom lines in FIG. 1. The downwardly depending leg 24 is adapted to engage the occipital bone 28 also designated by phantom lines in FIGS. 1 and 2 of the drawing.

The ends of the legs which form the Y-junctions are directed inwardly to provide engagement of the legs 22 and 24 with the head of a wearer of the spectacles 10.

By use of the temples of the present invention, pressure behind the ear which is attendant with usage of conventional temples is entirely avoided and yet the temples of the present invention will not permit the spectacles to shift or fall from the head of a wearer.

The spectacle frame of the present invention may be composed of any suitable material such as plastic. The temples may be ornamented with jewelry such as rhinestones to enhance the appearance thereof.

The present invention may be embodied in other specific forms without departing from the spirit or essential attributes thereof.

I claim:

1. In a spectacle frame of the type having a front frame with temples attached thereto, said temples adapted to be supported by and to extend beyond the ears of a wearer, the improvement comprising, each of said temples terminating remote from said front frame and beyond each mastoid process in the head of a wearer in first and second diverging legs, each of said first legs extending upwardly and rearwardly of its respective temple and being biased inwardly to engage the respective parietal bone in the head of a wearer, each of said second legs extending downwardly and rearwardly of its respective temple and being biased inwardly, each of said second legs being longer than each of said first legs and extending rearwardly of said first legs to engage the occipital bone in the head of a wearer, and each of said first and second legs cooperating with their respective temples and said front frame to constrain said spectacle frame on the head by pressure applied to the parietal and occipital bones in the head of a wearer while avoiding pressure on either mastoid process.